United States Patent Office 3,429,946
Patented Feb. 25, 1969

3,429,946
THERMOSETTING RESINS CONTAINING ALLYLIC ESTERS OF STYRENE-MALEIC ANHYDRIDE COPOLYMERS
Joseph A. Verdol, Dolton, and Bob G. Gower, Park Forest, Ill., assignors to Sinclair Research, Inc., New York, N.Y., a corporation of Delaware
No Drawing. Filed Nov. 22, 1965, Ser. No. 509,213
U.S. Cl. 260—836                           5 Claims
Int. Cl. C08g 45/10, 37/30; C08f 21/00

ABSTRACT OF THE DISCLOSURE

Thermosetting compositions may be prepared from allylic esters of styrene-maleic anhydride copolymers, a vinyl monomer and a cross-linking agent selected from epoxide resins, amine-aldehyde resins and unsaturated polyesters. In an example 15 g. of a phenyl-allyl ester of a styrene-maleic anhydride copolymer were combined with 10 g. of styrene and 10 g. Epon 820, and cured at 100° for 16 hrs. with benzoyl peroxide.

---

The present invention relates to improved laminating, casting molding and coating compositions containing as the essential ingredient an allylic ester of polymers of styrene and maleic anhydride.

The novel compositions of the invention are thermosetting or heat-curable mixtures consisting essentially of a polymerizable monomer, polymer ester of allylic monohydric alcohols and polymers of styrene and maleic anhydride and a polymeric resin selected from the group consisting of epoxy resins, aminoplast resins and polyester resins. Curing of the compositions of the invention provides products characterized by great strength, high impact resistance and high resistance to solvent attack. An added advantage is that the compositions of the invention, in many cases, can be premixed to give pourable liquid mixtures, stable over a long period of time which mixtures require only the addition of an initiator for curing. Each of the components of the composition of the invention will be discussed under a separate heading.

POLYMER ESTER

The polymer esters of the composition of the invention are the polymer esters of polymers of styrene and maleic anhydride and an allylic monohydric alcohol (including the ether allyl alcohols or allyloxymonohydric alcohols) of 3 to 30 carbon atoms, preferably 3 to 15 carbon atoms. The polymer esters of the invention, hereinafter referred to as styrene-maleic anhydride esters, can be essentially full or partial esters although the polymers are often partial esters containing large proportions of mono-esters, that is, anhydride groups which have opened and only one carboxylic group of which has been esterified. There also may be present to a considerable extent some diester as well as monoester and some unbroken anhydride groups. The percentage of esterification in the polymer esters of the invention can range from about 2 to 200%, preferably 20 to 90%, based on the half-ester. The average molecular weight of styrene-maleic anhydride allylic ester generally ranges from about 500 to 15,000 or more, preferably about 700 to 8000.

The allylic alcohols employed to form the polymer ester components of the invention include allyl alcohols represented by the structure:

CH₂=C—CH₂OH
|
R wherein R is hydrogen, alkyl, aryl, halogen, C≡N or other non-interfering substituent. Illustrative of allyl alcohols of the above structure are allyl alcohol, methallyl alcohol, 2-propylallyl alcohol, 2-pentylallyl alcohol, 2-phenylallyl alcohol, 2-chloroallyl alcohol, 2-cyanoallyl alcohol and the like.

Another group of allylic alcohols that may be used are the allyloxymonohydric alcohols, preferably the allyloxy lower alkanols. Representative of allyloxy monohydric alcohols include those having the structure:

(CH₂=C—CH₂—O—)ₙR'—OH
|
R wherein R is hydrogen or a hydrocarbon of 1 to 25 carbon atoms; R' is a hydrocarbon of 2 to 30 carbon atoms, preferably 2 to 15 carbon atoms and n is 1 to 3. R and R' can be saturated or unsaturated and are preferably alkyls. Illustrative of alcohols of this group are β-allyloxy-ethanol, di- and tri-allyl ethers of pentaerythritol and the allyl ethers of trimethylol propane. Other suitable ethers of allyl alcohols include those having the formula:

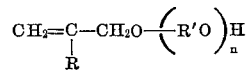

wherein R is as defined above, R' is a hydrocarbon of 1 to 4 carbon atoms, and n is 2 to 25, preferably 2 to 4. Examples of these alcohols are the allylic alcohols oxyalkylated with at least 1 mole of alkylene oxides of 1 to 4 carbons per mole of allyl alcohol.

The polymers of styrene and maleic anhydride, with which the allylic alcohols are reacted to provide the styrene-maleic anhydride allylic ester of the invention, are resinous polymers having about 1 to 4 moles, preferably 1 to 3 moles of styrene per mole of maleic anhydride. The polymer contains repeating styrene and maleic anhydride units and has an average molecular weight of at least about 400 up to about 15,000 or more. The melting point of the styrene-maleic acid copolymers generally ranges from about 80 to 300° C., as determined by the Fisher-Johns Melting Point Apparatus. The average molecular weight of the styrene maleic anhydride copolymer and the styrene-maleic anhydride allyl alcohol esters is determined by the thermoelectric differential vapor pressure method (VPΔ).

The polymer of styrene and maleic anhydride can be prepared by various methods. A preferred method is solution polymerization where the monomers are polymerized employing as a polymerization catalyst, a free-radical catalyst, such as benzoyl peroxide or dicumyl peroxide, at a temperature of about 75 to 300° C. or more. Suitable solvents include the aromatic hydrocarbon solvents such as cumene, p-cumene, xylene, toluene, etc. and ketonic solvents such as methylethylketone.

The styrene-maleic anhydride allylic esters can be prepared by reacting the allyl alcohol with the styrene-maleic anhydride polymer under either bulk or solvent conditions. The reaction temperature may vary depending up the solvent used and/or upon the particular resin employed. If no solvent is used, a desirable reaction temperature is about 140° to 175° C. Advantageously, an esterification catalyst such as lithium acetate is also employed.

POLYMERIZABLE MONOMER

The monomer materials employed in the composition of the invention are ethylenically unsaturated monomers containing at least one polymerizable

group, usually a terminal ethylenic group

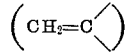

Such monomers include vinyl hydrocarbons, preferably of 2 to 20 carbon atoms as, for instance, mono- and di-alpha olefins such as isobutene, diisobutylene, octene, butadiene and isoprene; styrene, alpha-, ortho-, meta- and para-methylstyrenes the divinylbenzenes, etc.; the acrylic type acids, nitriles, amides and esters; the allylic-type carboxylic esters and alcohols, the monovinylpyridines, n-vinyl pyrollidone, vinylidene monomers; vinyl esters of halogen acids or of carboxylic acids; the alkyl vinyl ethers and the alkyl vinyl ketones.

Some acrylic type compounds may have the structure:

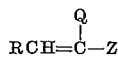

wherein Q is hydrogen, halogen or a hydrocarbon radical, say of 1 to 12 carbon atoms, as for instance, alkyl, alkenyl, cycloalkyl, aryl and aralkyl and Z is selected from —CN, —COOR and

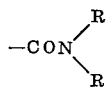

wherein R is hydrogen or a hydrocarbon radical as defined in Q above. Important monomers of this type include acrylonitrile and the alkyl acrylates, including the lower alkyl methacrylates. Other acrylic type compounds include the hydroxy-substituted esters of acrylic acids and polyhydric alcohols as for instance, ethylene glycol mono- and di-acrylates.

Allylic type esters, acids and alcohols include those having the structure:

$$(CH_2=\overset{Q'}{\underset{|}{C}}-CH_2-)_nY$$

wherein Q' is hydrogen, halogen,

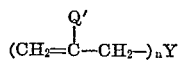

or a hydrocarbon radical of 1 to 12 carbon atoms, preferably alkyl or aryl; $n$ is 1 to 2; Y is hydroxy,

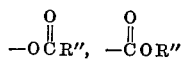

when $n$ is 1 and a diacyloxy radical of a carboxylic acid when $n$ is 2, R″ in the radicals

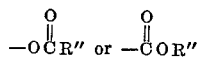

may be hydrogen or a hydrocarbon radical such as an alkyl, alkenyl, cycloalkyl, aryl or aralkyl, usually of 2 to 12 carbon atoms. Representative monomers of this type are methalkyl succinate, allyl acetate, diallyl phthalate and dimethyl itaconate.

Monovinylpyridines includes vinylpyridines, viz., the 2, and 4-vinylpyridines, and the alkyl-substituted vinylpyridines, e.g., 2-methyl-5-vinyl-pyridine, 5-ethyl-2-vinyl-pyridine, 2-methyl-5-vinylpyridine, and the like. N-vinyl monomers include N-vinylpyrole, N-vinyl carbazole, N-vinylindole, N-vinyl succinimide and the like.

Vinyl compounds include those having the structure $CH_2=CH-A$ wherein A is halogen or an acyloxy radical as for instance, vinyl chloride and vinyl acetate. Vinylidene monomers include for example vinylidene dichloride, diacetate, dinitriles and the like.

POLYMER RESIN (A) Epoxy resin.—The epoxy resin used in the formulations of the invention are the polyepoxide resinous compounds which contain reactive vicinal epoxy linkages (i.e.,

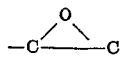

groups). The polyepoxides may be saturated or unsaturated, aliphatic, cycloalophatic, aromatic or heterocyclic and may be substituted if desired with non-interfering substituents.

Epoxy resins which have enjoyed a high degree of commercial success as glycidyl polyethers of polyhydric phenols obtained by reacting a polyhydric phenol with an excess, e.g. 4 to 8 mole excess of a chlorohydrin, such as epichlorohydrin and dichlorohydrin. Polyhydric phenols that can be used include resorcinol, catechol, hydroquinone, methyl resorcinol or polynuclear phenols such as 2,2-bis(4-hydroxyphenyl)-propane(Bisphenol A), 2,2-bis (4-hydroxyphenol)-butane, 4,4′-dihydroxybenzophenone, 2,2-bis(4-hydroxyphenyl) pentane and 1,5 dihydroxynaphthalene. The polymeric, glycidyl polyethers may have the formula:

wherein R is a divalent hydrocarbon radical of the polyhydric phenol and $n$ is an integer of 0 to 10.

Another class of epoxy resins are those prepared by reacting a chlorohydrin with polyhydric alcohols such as glycerol, propylene glycol, ethylene glycol, butylene glycol, sorbito, mannito, pentaerythritol, polyglycerol and the like. Another group of epoxy resins are those prepared from a chlorohydrin and polyamines containing reactive hydrogen atoms. Yet another class of epoxy resins are those prepared by the direct epoxidation of aliphatic or aromatic unsaturated compounds.

(B). Polyester resin.—Polyester resins are a well known class of resins. In general, polyester resins are linear, unsaturated resins formed by the reaction of one or more dicarboxylic acids and one or more polyhydric alcohols. Illustrative of the dicarboxylic acids are the saturated dicarboxylic acids (including the aromatic dicarboxylic acids and anhydrides) containing about 4 to 10 carbon atoms such as phthalic anhydride, isophthalic acid, adipic acid and azelaic acid and the unsaturated dicarboxylic acids, preferably $C_4$ to $C_5$ aliphatic dicarboxylic acids such as fumaric acid and maleic acid. Illustrative of polyhydric alcohols most commonly used are glycols preferably of about 2 to 6 carbon atoms such as ethylene, propylene, 1,3- and 2,3-butylene, diethylene and dipropylene glycols. An unsaturated monohydric alcohol, such as allyl alcohol, may be used in place of or part of the ployhydric alcohol.

(C) Aminoplasts.—The aminoplasts which can be employed in the compositions of the invention are water-insoluble and are prepared by the condensations of aldehydes with organic amino compounds, preferably to about 1 to 9 carbon atoms containing at least one, and preferably two, amino groups having at least two, but preferably three, replaceable hydrogen atoms. The preferred aminoplasts are urea-formaldehyde condensation products preferably having a mole ratio of formaldehyde to urea of 1 to 3:1. Examples of other suitable aminoplasts are condensation products of an aldehyde with melamine, guanidine, cyanamide and the like. Alkylated modifications of the above aminoplasts obtained, for instance, by alkylation or etherification with alkanols of 1 to 4 carbon atoms, can also be used. The preferred aldehyde is formaldehyde but other aldehydes such as propionaldehyde, furfural, glyoxal and the like may also be suitable.

The proportions of the components of the final composition can be varied over a wide range depending upon the final properties desired, the intended use, and particular polymeric resin selected. Ordinarily, about 1 to 50%, preferably about 5 to 50% by weight of vinyl monomer, about 1 to 45% preferably about 5 to 40% by weight of styrenemaleic anhydride allyl ester and about 5 to 80% by weight of the polymeric resin are employed. When the polymeric resin employed is either an epoxy resin or an aminoplast resin, the amount of these resins often falls in the range of about 5 to 50%, preferably 5 to 25% by weight. The polyester resins, however are frequently used in amounts from about 5 up to as high as about 80%, preferably about 20 to 60% weight.

If desired, the compositions of the invention may include suitable pigments as, for instance, titanium oxide, cadmium pigments, carbon, aluminum oxide, mica, silicate of iron oxide, silica, carbide, lead oxide, which can be extended with solid fillers such as zinc oxide, magnesium silicate, silica, mica, pumice, glass, clay and the like.

The curing of the compositions of the invention can be effected by adding a suitable catalyst to the composition and heating. Temperatures at which the curing is effected may vary depending upon the particular composition employed, its intended use and the desired rate of curing. Ordinarily, curing temperatures of about ambient temperature to 200° C. or more are suitable.

Illustrative of suitable catalysts for the curing are free-radical initiators such as benzoyl peroxide, di-t-butyl peroxide, methyl ethyl ketone peroxide, etc. The catalysts can be employed in catalytic amounts which most often fall in the range of about 0.1 to 2% by weight of the total composition. Accelerators, e.g. cobalt naphthenate, lead naphthenate, tertiary amine activators, such as N, N-dimethylaniline, can also be employed in the compositions.

The following examples are included to further illustrate preparation of the novel styrene-maleic anhydride allylic ester component of the present invention.

Example I

Mixtures of the styrene-maleic anhydride resin identified in Table I below as Resin A, and either allyl alcohol or methallyl alcohol together with 0.25% by weight of lithium acetate as a catalyst, were placed in a 1-liter stainless steel autoclave. The autoclave was purged with nitrogen and the mixture heated to 145–160° C. and maintained at this temperature for two hours. The autoclave was dismantled while still near the reaction temperature and the allylic half-ester allowed to cool. It was then ground to a powder, washed thoroughly with water in a Waring Blender to remove any unreacted allyl alcohol, filtered and dried. The yields of allylic half-esters were quantitative.

Example II

A mixture of styrene-maleic anhydride resin, A, B, C, D or E (all identified in Table I below), 2-phenylallyl alcohol and lithium acetate (0.25% by weight), in a 1-liter resin kettle, was purged with nitrogen. The mixture was then heated to 150° and maintained at this temperature for four hours with stirring. The product was removed from the kettle while still hot and allowed to solidify. The yield of half-ester was quantitative.

Example III

A mixture of styrene-maleic anhydride resin C of Table I (200 g.), 1-decanol (51 g.) and lithium acetate (1.0 g.) was heated with stirring in a 1-liter resin kettle at 160–170° for three hours in a nitrogen atmosphere. Methallyl alcohol (40 g.) was then added and stirring continued at 150–160° for 20 hours. The product was removed from the kettle while still hot and allowed to cool.

Example IV

A mixture of a styrene-maleic anhydride allylic half-ester (85% allyl half-ester of styrene-maleic anhydride A of Table I) (65 g.), propylene oxide (44 g.), sodium hydroxide (0.5 g.), methylethyl ketone (75 ml.) was placed in a 300 ml. stainless steel autoclave. The mixture was stirred and heated at 130° C. for two hours. The solvent was removed, affording a product with the same allylic content as the starting material and with essentially no free anhydride or carboxylic acid groups.

Analysis of the products of Examples I through IV are shown in Table I.

TABLE I

| Product | Styrene-Maleic Anhydride Resin Used | Alcohol for Esterification | | | Acid No. | Molecular Wt. | Iodine No. | Allylic Groups per Molecule [1] | Percent Esterification [2] | Melting Range, degrees |
|---|---|---|---|---|---|---|---|---|---|---|
| | | Allyl | Methallyl | 2-phenylallyl | | | | | | |
| 1 | A | XX | | | 237 | 761 | 23.8 | 0.7 | 30 | 93–97 |
| 2 | A | XX | | | 191 | 779 | 2.1 | 2.1 | 85 | 83–88 |
| 3 | A | | XX | | | 862 | 39.5 | 1.3 | 50 | 79–84 |
| 4 | A | | XX | | 210 | 843 | 67.3 | 2.2 | 85 | 74–78 |
| 5 | B | XX | | | 209 | 2,441 | 16.5 | 1.6 | 35 | 125–135 |
| 6 | B | XX | | | 195 | 2,072 | 29.8 | 2.4 | 50 | 123–128 |
| 7 | B | XX | | | 142 | 2,834 | 47.5 | 5.3 | 85 | 115–120 |
| 8 | B | | XX | | 223 | 2,390 | 20.8 | 2.0 | 40 | 125–133 |
| 9 | B | | XX | | 143 | 1,956 | 35.2 | 2.7 | 70 | 103–108 |
| 10 | B | | | XX | 131 | | 39.9 | | 85 | 75–79 |
| 11 | C | XX | | | 285 | 2,183 | 17.7 | 1.5 | 30 | 144–148 |
| 12 | C | XX | | | 250 | 2,129 | 35.5 | 3.0 | 50 | 143–148 |
| 13 | C | XX | | | 209 | 2,160 | 42.2 | 3.5 | 60 | 141–147 |
| 14 | C | XX | | | 178 | 2,282 | 61.7 | 5.5 | 85 | 137–143 |
| 15 | C | | XX | | 240 | 2,319 | 21.9 | 2.0 | 40 | 145–151 |
| 16 | C | | XX | | 161 | 1,920 | 433 | 3.3 | 70 | 118–123 |
| 17 | C | | | XX | 151 | | 54.3 | | 85 | 80–86 |
| 18 | D | XX | | | 221 | 1,856 | 79.2 | 5.8 | 70 | 138–145 |
| 19 | D | | XX | | 229 | 1,528 | 68.3 | 4.1 | 50 | 125–134 |
| 20 | D | | | XX | 169 | | 37.6 | | 90 | 110–114 |
| 21 | E | XX | | | 213 | | 33.7 | | ~90 | 95–102 |
| 22 | E | | | XX | 157 | | 9.1 | | ~90 | 38–44 |
| | | Alcohol Combination | | | | | | | | |
| 23 | C | Allyl, n-Decyl | | | 170 | 2,295 | 19.6 | 1.7 | ~90 | 99–116 |
| 24 | C | Methallyl, n-Decyl | | | 139 | 2,137 | 23.3 | 2.0 | | 94–110 |
| 25 | A | do | | | 166 | 968 | 32.3 | 1.2 | | 52–68 |
| 26 | D | do | | | 187 | 1,852 | 74.9 | 5.5 | | 110–124 |
| 27 | A | Allyl, propylene oxide | | | 23 | 1,412 | 47.3 | 2.6 | ~200 | (³) |

[1] Based on iodine number and molecular weight and based on half-ester as 100%.  [2] An estimate based on acid number, iodine number and molecular weight.  [3] Gum at R.T.

NOTE.—A Copolymer having a mole ratio of styrene to maleic anhydride of 1:1 and an average molecular weight of 400–70.
B Copolymer having a mole ratio of styrene to maleic anhydride of 3:1 and an average molecular weight of 1,900.
C Copolymer having a mole ratio of styrene to maleic anhydride of 2:1 and an average molecular weight of 1,700.
D Copolymer having a mole ratio of styrene to maleic anhydride of 1:1 and an average molecular weight of 1,600–2,000.
E 50% partial ester of butyl cellosolve and a SMA copolymer having a mole ratio of styrene to maleic anhydride 1:1 and an average molecular weight of 1,600–2,000 (for base resin).

The following examples are included to further illustrate the compositions of the invention and the products resulting from curing of the composition.

Example V

A formulation composed of:

| | Grams |
|---|---|
| Styrene-maleic Anhydride Resin C phenyl allyl ester [2] | 15 |
| Styrene | 10 |
| Epoxy resin [1] | 10 |

[1] Epon 820—a condensation product of bisphenol A and epichlorohydrin having a molecular weight of about 350–400 and an epoxide equivalent (i.e. the average weight per epoxy group contained in the average molecule of 175–210.
[2] Product 17 in Table I.

was placed in an aluminum dish and cured at 90 to 100° C. in the presence of benzoyl peroxide as an initiator for 16 hours. The resulting casting was clear, light yellow and very strong.

Example VI

Example V was repeated substituting styrene-maleic anhydride C allyl ester (Product 13 in Table I) for the C phenyl-allyl ester and adding 8 grams of xylene-formaldehyde resin as a plasticizer. The curing was extended to 48 hours. The result was a very strong, clear casting of light yellow color.

Example VII

Each of the formulations identified in Table II below were placed in an aluminum dish and cured at a temperature of 90–100° C. in the presence of methylethylketone peroxide as an initiator for 16 hours. The resulting castings in each case were clear, light yellow and very strong.

TABLE II.—COMPOSITION (PARTS BY WEIGHT)

| Polymer Ester [1] | Part | Parts Styrene | Polyester Resin | Parts | Polymeric Resin | Parts |
|---|---|---|---|---|---|---|
| 50% allyl ester of Resin C | 24 | 36 | F [2] | 48 | Epon 820 [4] | 15 |
| 60% allyl ester of Resin C | 24 | 36 | F [2] | 48 | ......do.[4] | 15 |
| 50% allyl ester of Resin B | 24 | 24 | F [2] | 48 | ......do.[4] | 15 |
| Do | 8 | 12 | F [2] | 16 | ......do.[4] | |
| 60% allyl ester of Resin C | 8 | 12 | F [2] | 16 | ......do.[4] | |
| 85% allyl ester of Resin C | 24 | 36 | F [2] | 48 | ......do.[4] | 15 |
| 85% allyl ester of Resin B | 24 | 36 | F [2] | 48 | ......do.[4] | 15 |
| 60% allyl ester of Resin C | 24 | 50 | F [2] | 48 | ......do.[4] | 15 |
| Do | 24 | 36 | F [2] | 60 | ......do.[4] | 15 |
| 85% 2-phenylallyl ester of Resin B | 8 | 12 | F [2] | 16 | ......do.[4] | 5 |
| 50% allyl ester of Resin C | 8 | 12 | F [2] | 16 | Urea-Formaldehyde | 5 |
| Do | 8 | 12 | F [2] | 16 | Melamine-Formaldehyde | 5 |
| 60% allyl ester of Resin C | 24 | 30 | G [3] | 48 | Epon 820 | 10 |
| Do | 24 | 36 | G [3] | 48 | ......do | 15 |

[1] See footnote Table I for identity of styrene-maleic anhydride resin.
[2] 70% unsaturated polyester and 30% styrene monomer, viscosity at 25° C. of 2,000–4,500 centipoise and specific gravity at 25° C. of 1.14–1.15.
[3] Unsaturated polyester diluted with vinyltoluene, viscosity at 77° F. of 2,200–2,600 centipoise specific gravity at 77° F. of 1.09.
[4] See footnote in Example V.

EXAMPLE VIII

The following formulations are typical polyester compositions of the invention including esters of styrene-maleic anhydride resins A, B and C of Table I and trimethylolpropane diallyl ether.

Formulation A

| | Parts by wt. |
|---|---|
| 50% half-ester of styrene-maleic anhydride Resin A and trimethylolpropane diallyl ether | 24 |
| Styrene | 36 |
| Polyester resin F | 48 |

Formulation B

| | |
|---|---|
| 50% half-ester of styrene-maleic anhydride Resin B and trimethylolpropane diallyl ether | 24 |
| Styrene | 36 |
| Polyester resin F | 48 |

Formulation C

| | |
|---|---|
| 50% half-ester of styrene-maleic anhydride Resin C and trimethylolpropane diallylester | 24 |
| Styrene | 36 |
| Polyester resin F | 48 |

The above formulations are cured readily at room temperature while open to air with free-radical initiators such as methyl ethyl ketone peroxide and conventional accelerators such as cobalt naphthenate. The compositions cure to a tack-free state within 2 to 12 hours and are not imprinted by pressing with a thumb on the casting or coating. They continue to cure slowly and are very resistant to fingernail scratching after 3 days. By comparison castings and coatings of styrene and polyester Resin F, i.e. without the ester of styrene maleic anhydride resin, cured under identical conditions, were still tacky to fingerprint impression after one week.

We claim:

1. A thermosetting composition consisting essentially of about 1 to 50 percent by weight of an ethylenically unsaturated monomer containing at least one polymerizable $$CH_2=C\diagup$$

group, about 1 to 45 percent by weight of an allylic ester of a polymer of styrene and maleic anhydride having 1 to 4 moles of styrene per mole of maleic anhydride and molecular weight of at least 400, said polymeric ester having a percent esterification in the range of about 2 to 200 percent based on the half-ester, and about 5 to 80 percent by weight of a polymer resin selected from the group consisting of a polyepoxide resin having greater than 1 epoxy group per molecule; a linear, unsaturated polyester of a dicarboxylic acid and a polyhydric alcohol; and a water-insoluble condensation product of an aldehyde an organic amino compound having 1 to 9 carbon atoms and at least one amino group containing at least two replaceable hydrogen groups.

2. The composition of claim 1 wherein the polymer resin employed is about 5 to 25% of a polyepoxide resin having greater than 1 epoxy group per molecule.

3. The composition of claim 1 wherein the polymer resin employed is about 5 to 25% of water-insoluble condensation product of urea and formaldehyde in a mole ratio of urea to formaldehyde of 1 to 3:1.

4. The composition of claim 1 wherein the polymer resin employed is about 20 to 60% of said linear, unsaturated polyester.

5. The composition of claim 1 wherein the ethylenically unsaturated monomer is styrene.

(References on following page)

References Cited

UNITED STATES PATENTS

| | | | |
|---|---|---|---|
| 2,537,019 | 1/1951 | Barrett | 260—855 |
| 2,975,148 | 3/1961 | Skiff | 260—837 |
| 2,977,334 | 3/1961 | Zopf | 260—837 |
| 3,002,860 | 10/1961 | Bishop | 260—837 |
| 3,136,736 | 6/1964 | Washburne | 260—837 |
| 3,317,457 | 5/1967 | Zimmerman | 260—826 |

FOREIGN PATENTS

| | | |
|---|---|---|
| 591,565 | 1/1960 | Canada. |
| 673,081 | 10/1963 | Canada. |

MURRAY TILLMAN, *Primary Examiner.*

PAUL LIEBERMAN, *Assistant Examiner.*

U.S. Cl. X.R.

260—37, 39, 40, 75, 78.5, 837, 855, 862